US006576127B1

(12) United States Patent
Ohkawa

(10) Patent No.: US 6,576,127 B1
(45) Date of Patent: Jun. 10, 2003

(54) PONDEROMOTIVE FORCE PLUG FOR A PLASMA MASS FILTER

(75) Inventor: Tihiro Ohkawa, La Jolla, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 10/086,575

(22) Filed: Feb. 28, 2002

(51) Int. Cl.[7] ............................ B03C 1/00; B01J 19/08

(52) U.S. Cl. ....................... 210/222; 210/243; 210/748; 422/186.01; 422/186.02; 250/281; 209/12.1; 209/727; 204/155

(58) Field of Search ................................ 210/222, 243, 210/695, 748; 422/186.01, 186.03, 906; 209/12.1, 227; 204/155; 250/281, 282

(56) References Cited

U.S. PATENT DOCUMENTS

| | | | |
|---|---|---|---|
| 3,722,677 | A | 3/1973 | Lehnert |
| 5,146,137 | A | 9/1992 | Gesche |
| 5,225,740 | A | 7/1993 | Ohkawa |
| 5,350,454 | A | 9/1994 | Ohkawa |
| 5,611,947 | A | 3/1997 | Vavruska |
| 6,068,784 | A | 5/2000 | Collins |
| 6,096,220 | A | 8/2000 | Ohkawa |
| 6,169,520 | B1 | 1/2001 | Anderson |
| 6,251,281 | B1 | 6/2001 | Ohkawa |

*Primary Examiner*—David A. Reifsnyder
(74) *Attorney, Agent, or Firm*—Nydegger & Associates

(57) ABSTRACT

A plasma mass filter having features to prevent plasma loss through one end of the filter and thereby increase energy efficiency includes a cylindrical wave guide to surround a plasma. Coil(s) and electrode(s) are provided to establish crossed electric and magnetic fields within the wave guide to separate plasma ions according to their mass. A circularly polarized electromagnetic wave having specific characteristics is launched through a first end of the wave guide and into the plasma to generate ponderomotive forces on the plasma particles via photon reflection. These forces cause the plasma particles to move towards the second end of the wave guide and thus prevent plasma loss through the first end of the wave guide. This structure allows feed plasma to be continuously introduced into the first end of the wave guide for separation therein. A resonance cavity is provided to redirect the reflected photons back into the plasma.

20 Claims, 2 Drawing Sheets

PONDEROMOTIVE FORCE PLUG FOR A PLASMA MASS FILTER

FIELD OF THE INVENTION

The present invention pertains generally to devices and methods for producing and processing plasmas. More particularly, the present invention pertains to a device for preventing plasma loss through one end of a cylindrical plasma chamber. The present invention is particularly, but not exclusively, useful as a device that is positionable at one end of a plasma mass filter and which uses ponderomotive forces to direct plasma particles away from the end of the plasma mass filter.

BACKGROUND OF THE INVENTION

It is well known that the orbital motions of charged particles (ions and electrons) in a magnetic field, or in crossed electric and magnetic fields, will differ from each other according to their respective mass to charge ratio. Thus, when the probability of ion collision is significantly reduced, ions can be separated according to their respective mass to charge ratio. For example, U.S. Pat. No. 6,096,220, which issued on Aug. 1, 2000 to Ohkawa, for an invention entitled "Plasma Mass Filter" and which is assigned to the same assignee as the present invention, discloses a device which relies on the different, predictable, orbital motions of charged particles in crossed electric and magnetic fields in a plasma chamber to separate the charged particles from each other.

In the filter disclosed in Ohkawa '220, a multi-species plasma is introduced into one end of a cylindrical chamber for interaction with crossed electric and magnetic fields. As further disclosed in Ohkawa '220, the fields can be configured to cause ions having relatively high-mass to charge ratios to be placed on unconfined orbits. These ions are directed towards the cylindrical wall for collection. On the other hand, ions having relatively low-mass to charge ratios are placed on confined orbits inside the chamber. These ions transit through the chamber toward the ends of the chamber. It can happen, however, that some low-mass ions are directed toward the end where the multi-species plasma is being introduced into the chamber. This allows the low-mass ions to be re-mixed with multi-species plasma, lowering the energy efficiency of the plasma mass filter since these light ions will be reionized and reprocessed.

One way to overcome the end loss described above is to use a tandem plasma mass filter. Specifically, U.S. Pat. No. 6,235,202, which issued on May 22, 2001 to Ohkawa, for an invention entitled "Tandem Plasma Mass Filter" and which is assigned to the same assignee as the present invention, discloses a device wherein the feed material is introduced midway between the ends of a cylindrical plasma chamber. After separation in the plasma chamber, the light ions are collected at both ends of the cylindrical chamber. Because a plasma needs to be created near the center of the plasma chamber, the tandem mass filter requires a high density vapor jet or some other injector to introduce vapor into the chamber. Once the vapor is introduced into the chamber, an r-f antenna or some other mechanism is required to heat and ionize the vapor. The present invention solves the end loss problem in a different way than the tandem plasma mass filter. Specifically, the present invention contemplates the use of r-f ponderomotive forces to prevent plasma particles in a cylindrical plasma chamber from reaching one end of a plasma chamber. At the same time, the present invention allows for a multi-species plasma to be introduced into the plasma chamber from the end, for example with a diffuse vapor source.

It is well known that photons carry momentum. When a photon is either reflected from a media or absorbed by the media, momentum is transferred from the photon to the medium. Importantly, this momentum transfer exerts a force on the medium. In the case where the medium is a plasma, a force is exerted on the particles (ions and electrons) in the plasma. The force imparted on the media (plasma) during photon absorption is relatively small because the momentum of photons is relatively small per their energy (i.e. the momentum of photons is their energy divided by the velocity of light (c)). The power flux, P, of photons required to exert a pressure, p, on the medium via photon absorption is given by P=p c. Thus, to generate a pressure of 1 pascal using photon absorption requires approximately 300 $MW/m^2$ of power flux. Unfortunately, this level of power flux is, for all practical purposes, impossible to implement. An additional drawback associated with the use of photon absorption to impart a force on a media is that each photon can only be used once to impart a force. This is because upon absorption of the electromagnetic wave by the media (i.e. plasma), the wave is dissipated and cannot be reused.

When a wave of photons (i.e. an electromagnetic wave) is evanescent in a medium, reflection of the wave occurs. Unlike absorption, in the case of reflection, the photon energy is not lost. Rather, the photons can be reused by simply redirecting the reflected photons, again and again. For example, an r-f cavity can be used to redirect the reflected photons. For an r-f cavity, the number of reflections is equal to the Q-value of the cavity, and the power, P, required to exert a pressure, p, on the medium becomes $$P = pc/Q. \qquad [1]$$

For Q=1000, a pressure of 1 pascal requires a power of approximately 0.3 $MW/m^2$. Thus, it is much more efficient to use photon reflection (by using an electromagnetic wave that is evanescent in a magnetized plasma) than photon absorption to generate ponderomotive forces on a plasma.

In a uniform, stationary magnetic field, the ions and electrons in a plasma will rotate in oppositely directed orbits. If a circularly polarized electromagnetic wave is propagating in the direction of the magnetic field, two distinct circular polarizations are possible; right-hand polarized and left-hand polarized. In the right-hand polarized wave, the electric field rotates in the same direction as the gyration of the electrons in the stationary magnetic field. In contrast, in the left-hand polarized wave, the electric field rotates in the opposite direction as the gyration of the electrons in the stationary magnetic field.

From the dispersion relationship, it can be determined whether a wave will be evanescent in a selected media. For example, the dispersion of the left-hand polarized wave in a plasma is given by $$k^2 = c^{-2}\{\omega^2 - \omega_p^2[1+\Omega_e/\omega]^{-1}\} \qquad [2a]$$

where k is the wave number, $\omega$ is the frequency, $\omega_p$ is the plasma frequency $\omega_p = \sqrt{ne^2/E_0 m_e}$ and $\Omega_e$ is the electron cyclotron frequency $\Omega_e = -eB/m_e$. Similarly, the dispersion of the right-hand circularly polarized wave in a plasma is given by $$k^2 = c^{-2}\{(\omega^2 - \omega_p^2[1-\Omega_e/\omega]^{-1}\} \qquad [2b]$$

Thus, the right-hand circularly polarized wave is propagating if $\omega < \Omega_e$ while the left-hand circularly polarized wave is evanescent if $$\omega<[\omega_p^2+\Omega_e^2/4]^{1/2}-\Omega_e/2. \quad [3]$$

Thus, a left-hand circularly polarized wave having (o as indicated in equation [3] is evanescent and can be used to establish a ponderomotive force via photon reflection. One example of a right-hand circularly polarized wave is a helicon wave with azimuthal mode number, I=1.

Consider now a circularly polarized $TE_{11}$ mode electromagnetic wave in a circular wave guide. The dispersion for both polarizations is given by $$k^2=\omega^2(c^2=\lambda^2 \quad [4]$$

where $\lambda=\epsilon/a$, $\epsilon$ is the first null of the first order Bessel Function derivative, $J_1'$, and a is the radius of the guide. Importantly, the wave is evanescent if $\omega<c\lambda$. The analysis below shows that the evanescence produced by the circular wave guide is just as effective as the plasma induced evanescence in exerting the ponderomotive force on charged particles. Furthermore, as the density of charged particles is increased, the dispersion changes from the dispersion in vacuum. The ponderomotive force, however, is present as long as the evanescence is maintained.

Consider now the motion of a charged particle with charge, q, and mass, M, under the electric field given by $$Ex+iE_y=E\ \exp[-i\omega t+kz]. \quad [5]$$

The magnetic field is given by $$Bx+iB_y=[\omega/k]E\ \exp[-i\omega t+kz]. \quad [6]$$

The equations of motion become $$M\ d\ v_x/dt=q\ E_x+q\ v_yB_o$$

$$M\ d\ v_y/dt=q\ E_y-q\ v_xB_o$$

$$M\ d\ v_z/dt=F_z=q\ [V_xB_y-v_yB_x]\ [7]$$

from which the following relationships are obtained $$v_x+i\ v_y=-i[q/M]\ [-\omega+\Omega]^{-1}\ E\ \exp[-i\omega t+kz] \quad [8]$$

$$F_z=[k\ q^2/M\ \omega]\ [-\omega+\Omega]^{-1}E^2\exp\ [2\ kz] \quad [9]$$

where $\Omega$ is the cyclotron frequency, including the sign.

If the sign of $B_o$ is chosen so that $\Omega_e<0$ and $\Omega_i>0$, then the ponderomotive force on the electrons and ions is negative for $\omega>\Omega_i$. Thus, they are both repelled from the stronger field region. The magnitude of the electric field necessary to stop the electron of energy $T_e$ is given by $$E^2=\omega B_o[T_e/e] \quad [10]$$

with $\omega=10^9$/s, $B_o=0.1$ T and $T_e=1$ eV, the field is $10^4$ V/m.

The response of the plasma is obtained by multiplying the plasma density, n, to eq [8], $$j_x+ij_y=-i[q^2n/\ m]\ [-\omega+\Omega]^{-1}\ E\ \exp\ [-i\omega t+k\ z]. \quad [11]$$

The contributions from the electrons and the ions must be added. Similarly, the total ponderomotive force is obtained by summing equation [9] for all charged particles.

We define the ponderomotive potential U by $$\partial U/\partial z=-F_z \quad [12]$$

so the potential is independent of k as long as the maximum value of E is fixed. Thus, it takes as much electric field to repel a single electron as the plasma electrons. It is contemplated that the negative value of the plasma dielectric constant causes the total pressure to be the kinetic pressure minus the electric stress. In situations where the radial mode number is not zero, modes with many different k's can propagate and the matching requires summary over all k's.

In light of the above, it is an object of the present invention to provide a device that is positionable at one end of a plasma mass filter which uses ponderomotive forces to direct the plasma particles away from the end of the plasma mass filter. It is another object of the present invention to provide a plasma mass filter having improved separation efficiency and reduced end loss. It is yet another object of the present invention to provide a device for a plasma mass filter that reduces end loss and allows for the plasma to be introduced into the chamber with a diffuse vapor source. Yet another object of the present invention is to provide an end plug for a plasma mass filter which is easy to use, relatively simple to implement, and comparatively cost effective.

SUMMARY OF THE PREFERRED EMBODIMENTS

The present invention is directed to a device and method for preventing plasma loss through one end of a cylindrical plasma chamber. In the preferred embodiment, the present invention can be used in conjunction with a plasma mass filter to increase the energy efficiency of the filter. In accordance with the present invention, this is achieved by preventing plasma particles as they undergo separation from returning to the end of the cylindrical chamber where the feed for the plasma is being introduced into the chamber. To prevent the plasma particles from returning to the end of the chamber, an electromagnetic wave having specific characteristics is launched into the plasma to generate ponderomotive forces on the plasma particles. Specifically, in accordance with the mathematical calculations set forth above, the electromagnetic wave has two important characteristics for the present invention. First, the electromagnetic wave must be evanescent in the plasma. Second, the electromagnetic wave must have a frequency, $\omega$, which is greater than the ion cyclotron frequency in the plasma, $\Omega_1$. As further indicated above, such an electromagnetic wave can be established using a cylindrical wave guide.

In the preferred embodiment of the present invention, the plasma chamber includes a cylindrical wave guide to surround a plasma. The cylindrical wave guide of radius, a, is centered along a longitudinal axis and is formed with a first open end for receiving a multi-species plasma and a second end to allow plasma particles to exit. For the case where the present invention is used in conjunction with a plasma mass filter, E x B separation is accomplished within the cylindrical wave guide. In any case, coils are provided to generate a substantially uniform magnetic field having a magnitude B in the plasma chamber (i.e. in the wave guide). Preferably, the magnetic field is oriented substantially along the longitudinal axis of the wave guide. With this magnetic field, ions and electrons in the plasma rotate at respective cyclotron frequencies $\Omega_e$ and $\Omega_i$.

An antenna is provided to launch an electromagnetic wave into the wave guide through the first end of the wave guide. The electromagnetic wave is preferably launched substantially in the direction of the magnetic field (i.e. axially). Specifically, the antenna is preferably configured relative to the wave guide to launch an electromagnetic wave that will create a circularly polarized $TE_{11}$ mode electromagnetic wave in the wave guide. Furthermore, the circularly polarized electromagnetic wave that is created in the wave guide preferably has a frequency $\omega$, wherein $\omega<c\epsilon/a$, with c being the speed of light and $\epsilon$ being the null of the first order Bessel Function derivative $J_1$' of the wave guide. Additionally, for the present invention, the antenna is configured to produce a circularly polarized electromagnetic wave in the wave guide having an E vector that rotates at frequency, ω, in a direction opposite to the direction of electron rotation in the plasma (i.e. left-hand circularly polarized wave). As such, the electromagnetic wave will be evanescent in the wave guide and impart a ponderomotive force on the plasma particles. To impart a confining ponderomotive force (i.e. a force directed towards the second end of the wave guide) on both the ions and the electrons, the frequency, ω, of the electromagnetic wave is chosen to be greater than the ion cyclotron frequency, $\Omega_i$.

As indicated in the discussion above, because the electromagnetic wave is evanescent in the wave guide, the wave will be reflected from the plasma, producing a reflected wave that is directed back toward the first end of the wave guide. For the present invention, a resonance cavity is provided to then redirect the reflected photons back into the plasma. To accomplish this, the resonance cavity includes a cylindrical wave guide having a reflective endpiece at one end. The other end of the resonant cavity is attached to the first end of the plasma chamber wave guide (i.e. the wave guide that surrounds the plasma). This results in a combination of structure that allows the electromagnetic waves to travel back and forth between the plasma and the reflective endpiece. Each time the wave reflects from the plasma, a ponderomotive force is imparted on the plasma particles. Because the wave is required to propagate in the resonance chamber, the resonance chamber wave guide is dimensioned to ensure the wave is above the cutoff frequency for the resonance chamber wave guide. Alternatively, if it is desired to have equal diameters for the resonance chamber wave guide and the plasma chamber wave guide, the resonance chamber wave guide can be filled with a suitable dielectric to ensure the wave propagates in the resonance chamber wave guide and is evanescent in the plasma chamber wave guide.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
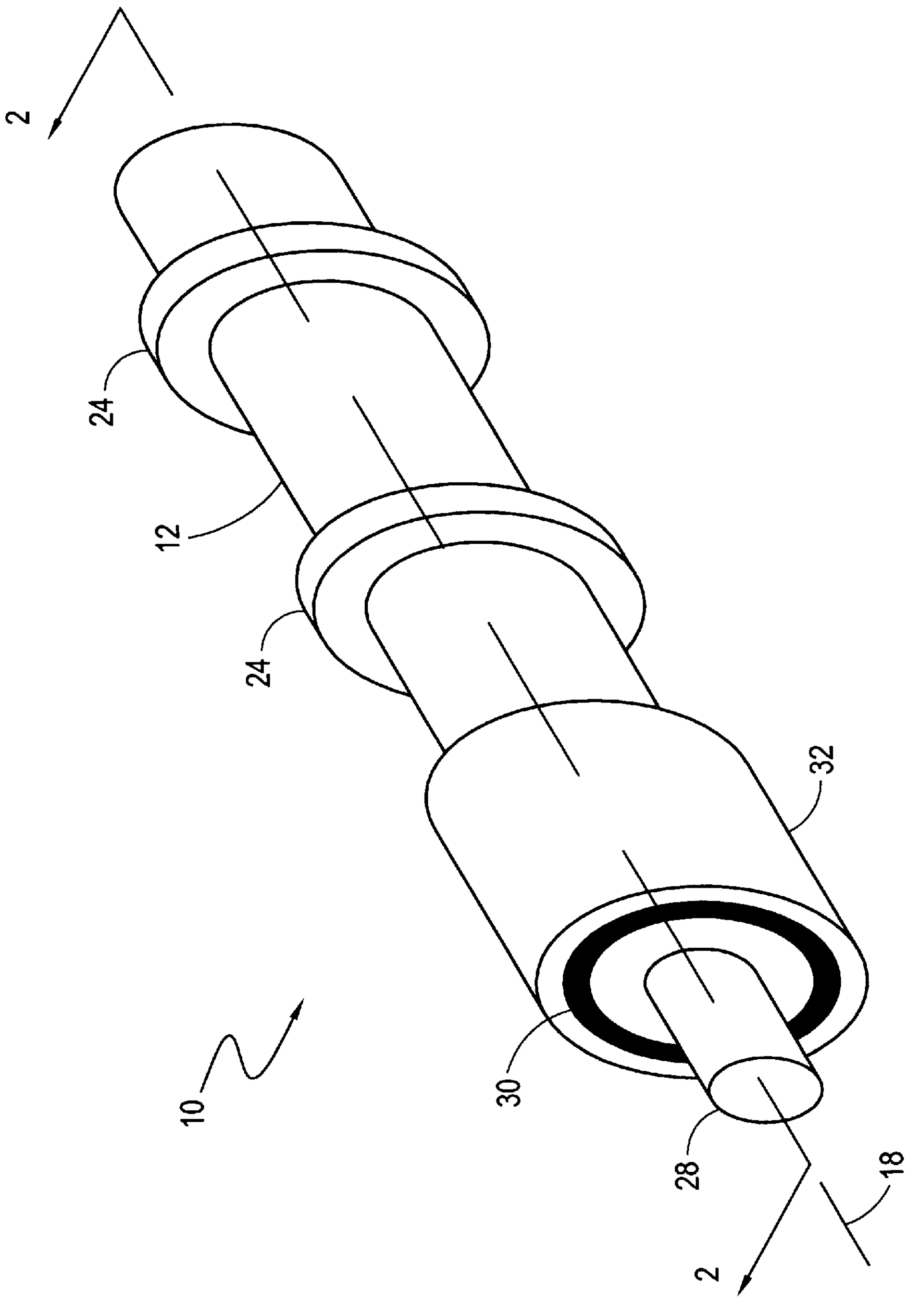
FIG. 1 is a perspective view of a plasma mass filter in accordance with the present invention.

Referring initially to FIG. 1, a plasma mass filter in accordance with the present invention is shown and generally designated 10. With cross reference to FIGS. 1 and 2, it can be seen that the filter 10 includes a plasma chamber 12 for containing a multi-species plasma in a volume 14. As shown, the plasma chamber 12 includes a cylindrical wave guide 16 to surround the volume 14. As further shown, the cylindrical wave guide 16 has a radius, a, is centered along a longitudinal axis 18, and is formed with a first open end 20 and a second open end 22.

In accordance with the present invention, the plasma chamber 12 of the filter 10 includes a plurality of magnetic coils 24 which are mounted on the outer surface of the wave guide 16 to surround the volume 14. In a manner well known in the pertinent art, the coils 24 can be activated to create a magnetic field in the plasma chamber 12 which has a component $B_z$ that is directed substantially along the longitudinal axis 18. With this magnetic field, moving ions and electrons in the plasma chamber 12 rotate at respective cyclotron frequencies $\Omega_e$ and $\Omega_i$.

Additionally, as shown, the filter 10 includes a plurality of voltage control rings 26, of which the voltage rings 26*a–b* are representative. As shown these voltage control rings 26*a–b* are located near the end 22 of the wave guide 16 and lie generally in a plane that is substantially perpendicular to the longitudinal axis 18. With this combination, a radially oriented electric field, $E_r$, can be generated. For the plasma mass filter 10 of the present invention, the voltage along the longitudinal axis 18, $V_{ctr}$, will normally be a positive voltage compared to the voltage at the inner surface of the wave guide 16 which will normally be a zero voltage.

For the plasma mass filter 10 of the present invention, the magnetic field $B_z$ and the electric field $E_r$ are specifically oriented to create crossed electric magnetic fields. As is well known to the skilled artisan, crossed electric magnetic fields cause charged particles (i.e. ions and electrons) to move on predictable, helical paths.

In accordance with the present invention, the filter 10 includes a source 28 for introducing a material into the plasma chamber 12 for separation. As shown, the source 28 is positioned to introduce material through the end 20 of the wave guide 16 and into the plasma chamber 12. In one embodiment of the present invention, the source 28 constitutes a diffuse vapor source which introduces a vapor of the material to be separated into the plasma chamber 12. When a diffuse vapor source is used, a mechanism for ionizing and heating the vapor to create a multi-species plasma in the plasma chamber 12 is provided. Alteratively, the source 28 can include a plasma injector, plasma torch or any other plasma source known in the pertinent art. In this case, a multi-species plasma is created at the source and introduced into the chamber 12.

Figure 2:
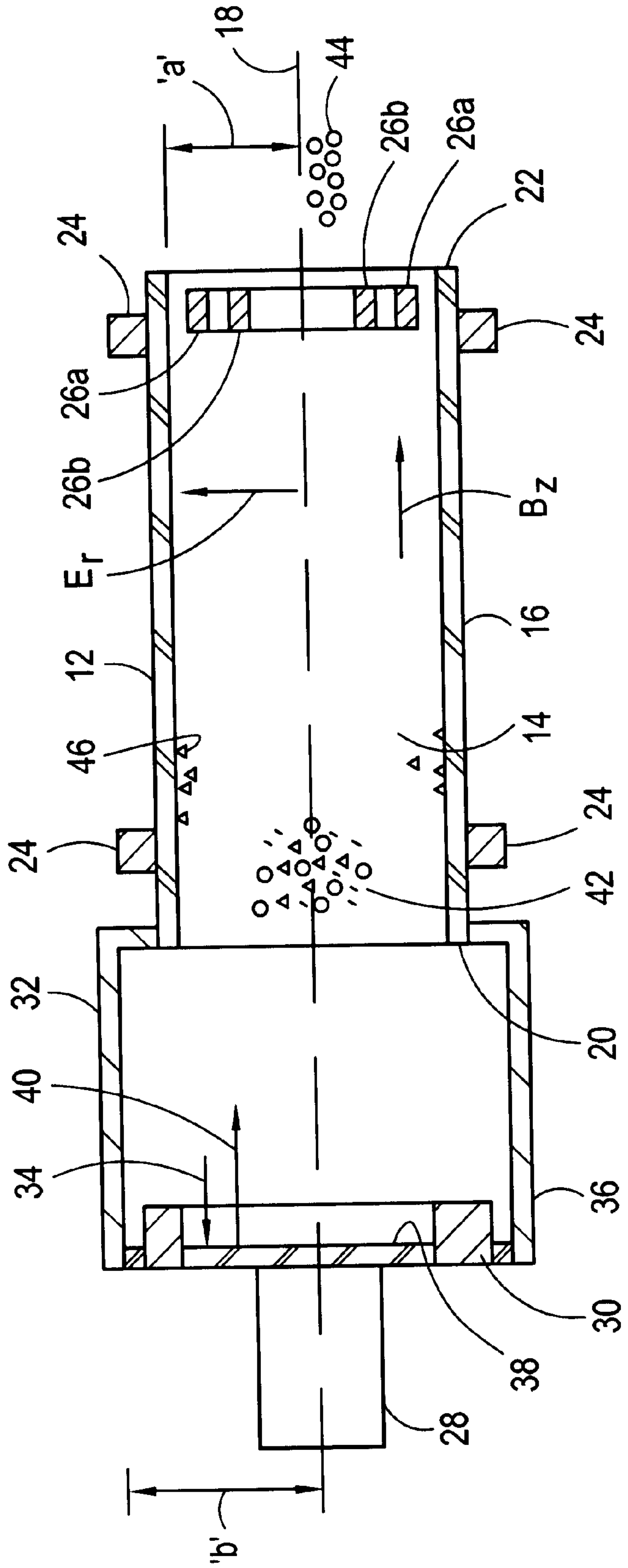
FIG. 2 is a sectional view of the plasma mass filter shown in FIG. 1 taken along line 2—2 in FIG. 1.

Referring still to FIGS. 1 and 2, the filter 10 includes an antenna 30 to launch an electromagnetic wave through end 20 and into the wave guide 16. The electromagnetic wave is preferably launched substantially in the direction of the magnetic field (i.e. in the direction of axis 18). Preferably, the antenna 30 is configured relative to the wave guide 16 to launch an electromagnetic wave that will create a circularly polarized $TE_{11}$, mode electromagnetic wave in the wave guide 16. Furthermore, the circularly polarized electromagnetic wave that is created in the wave guide 16 preferably has a frequency ω, wherein $\omega < c\epsilon / a$, with c being the speed of light and ϵ being the first null of $J_1$' of the wave guide 16. Additionally, for the present invention, the antenna 30 is configured to produce an elliptically polarized electromagnetic wave (including circularly polarized) in the wave guide 16 having an E vector that rotates at frequency, ω, in a direction opposite to the direction of electron rotation in the plasma. As such, the electromagnetic wave will be evanescent in the wave guide 16 and impart a ponderomotive force on the plasma particles. To impart a confining ponderomotive force (i.e. a force directed towards the end 22 of the wave guide 16) on both the ions and the electrons, the frequency, ω, of the electromagnetic wave is chosen to be greater than the ion cyclotron frequency, $\Omega_i$.

For the present invention, any type of antenna 30 or antenna system capable of establishing the electromagnetic wave having characteristics described in the preceding paragraph in the wave guide 16 can be used. For example, a multi-element antenna having a controller to vary the phasing between elements can be used. Alternatively, an antenna 30 can include a mode converter to create the elliptically polarized electromagnetic wave. Additionally, the antenna 30 can function in combination with the wave guide 16 to produce the required electromagnetic wave in the wave guide 16.

In the preferred embodiment of the present invention, the filter 10 includes a resonance cavity 32 to redirect reflected photons back into the plasma chamber 12. As indicated in the discussion above, because the electromagnetic wave created by the antenna 30 is evanescent in the wave guide 16, the wave will be reflected from the plasma in the volume 14, producing a reflected wave (indicated by exemplary arrow 34) that is directed out of the end 20 of the wave guide 16. As shown, the resonance cavity 32 includes a cylindrical wave guide 36 having a reflective endpiece 38. As further shown, the resonant cavity 32 is attached to the first end 20 of the wave guide 16. The reflective endpiece 38 is oriented to lie in a plane substantially perpendicular to the longitudinal axis 18. With this orientation, the reflective endpiece 38 is able to redirect (through reflection) reflected waves (such as the wave shown by exemplary arrow 34) back into the volume 14 (redirected wave shown by exemplary arrow 40). It is to be appreciated that the redirected wave is able to interact with plasma in the volume 14 and impart a ponderomotive force on plasma particles in the volume 14. The number of times a given wave is reflected in the resonance cavity 32 is equal to the Q-value of the resonance cavity 32. In accordance with the mathematical equations provided in the background section above, the Q value can be used to estimate the antenna power required to produce a desired pressure on a plasma in the volume 14.

In the preferred embodiment of the present invention, the wave guide 36 has a radius, 'b', wherein 'b'>'a'. This relative dimensioning between wave guide 36 and wave guide 16 allows the wave to propagate in the resonance cavity 32 (i.e. 'b' is chosen to ensure the wave frequency is above the cutoff frequency for the wave guide 36) yet be evanescent in the wave guide 16 (i.e. 'a'is chosen to ensure the wave frequency is below the cutoff frequency for the wave guide 36). Alternatively, if it is desired to have equal diameters for the wave guide 16 and wave guide 36, the wave guide 36 can be filled with a suitable dielectric to ensure the wave propagates in the resonance cavity 32 and is evanescent in the plasma chamber 12.

In the operation of the present invention, a multi-species plasma 42 having electrons, ions of relatively low-mass to charge ratio (hereinafter referred to as light ions) and ions of relatively high-mass to charge ratio (hereinafter referred to as heavy ions) is established in the volume 14. As indicated above, there are many ways to establish the multi-species plasma 42 in the volume 14. In the preferred embodiment, the source 28 is a diffuse vapor source and the vapor is ionized and heated using the antenna 30. When the antenna 30 is used to both heat and apply a ponderomotive force on the multi-species plasma 42, an elliptically polarized electromagnetic wave is used. Specifically, the elliptically polarized electromagnetic wave has a lefthand circularly polarized wave component for applying a ponderomotive force and a right-hand circularly polarized wave component for heating. Generally, more power is required for heating than applying the ponderomotive force, and the elliptically polarized electromagnetic wave is configured accordingly (i.e. the wave is created having a relatively strong, right-hand circularly polarized wave component and a relatively weak, left-hand circularly polarized wave component).

With the multi-species plasma 42 established in the volume 14, light ions 44 are separated from heavy ions 46 via the crossed electric magnetic fields in the volume 14. Under the influence of the crossed electric magnetic fields, charged particles confined in the multi-species plasma 42 will travel generally along helical paths around the longitudinal axis 18. Importantly, heavy ions 46 will travel on helical paths of relatively large radius causing them to strike the inner surface of the wave guide 16 and be captured. On the other hand, light ions 44 will travel on helical paths of relatively small radius causing them to transit through the plasma chamber 12. Specifically, the demarcation between light ions 44 and heavy ions 46 is a cut-off mass, $M_c$, which can be established by the expression:

$$Mc=ea^2(B_z)^2/8V_{ctr}.$$

In this expression, e is the charge on an electron, and the other variables have been defined above. Of these variables in the expression, a, $B_z$ and $V_{ctr}$, can all be specifically designed or established in view of the ions that require separation.

As indicated above and shown in FIG. 2, the heavy ions 46 strike the inner surface of the wave guide 16 and are captured. If desired, a collector (not shown) can be installed in the wave guide 16 to facilitate capture of the heavy ions 46. The light ions 44, on the other hand, transit the plasma chamber 12 and exit through end 22 of the wave guide 16 for collection. If desired, a collector (not shown) can be installed at the end 22 of the wave guide 16 to facilitate capture of the light ions 44. Importantly, the light ions 44 and heavy ions 46 are prevented from exiting the plasma chamber 12 through the end 20 of the wave guide 16 due to the ponderomotive forces that are generated by the antenna 30. With this feature, material can be continuously introduced into the end 20 of the wave guide 16 for separation and there is little or no mixing between the feed material and multi-species plasma 42 that is undergoing separation. This reduction in mixing increases the separation efficiency of the filter 10.

While the particular Ponderomotive Force End Plug for a Plasma Mass Filter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for creating an interspace region inside a plasma chamber using a ponderomotive force to effectively distance a plasma in the chamber from a portion of the wall of the chamber, the plasma including electrons having a cyclotron frequency of $\Omega_e$ and said device comprising:

means for generating a substantially uniform magnetic field in the plasma chamber, said magnetic field having a magnitude B and a direction;

an antenna for propagating an electromagnetic wave into the plasma chamber substantially in the direction of said magnetic field;

means for rotating the electromagnetic wave at a frequency ω with said electromagnetic wave being left-hand circularly polarized relative to electrons in the plasma; and means for tuning said frequency ω of the electromagnetic wave, with $\omega<\Omega_e$, to establish an evanescence of the electromagnetic wave in the plasma and generate the ponderomotive force on the plasma to create said interspace region.

2. A device as recited in claim 1 wherein the plasma includes ions having a cyclotron frequency of $\Omega_i$ and wherein said tuning means establishes the frequency ω of the electromagnetic wave, with $\omega > \Omega_i$.

3. A device as recited in claim 1 wherein said means for generating a substantially uniform magnetic field in the plasma chamber comprises coils.

4. A device as recited in claim 1 wherein said electromagnetic wave has a frequency in the r-f spectrum.

5. A device as recited in claim 1 wherein said electromagnetic wave is circularly polarized.

6. A device as recited in claim 1 wherein said electromagnetic wave is elliptically polarized to both generate the ponderomotive force on the plasma and to heat the plasma via electron cyclotron heating.

7. A device for preventing plasma loss at one end of a cylindrical volume of plasma, said device comprising:

a cylindrical wave guide of radius, 'a', formed with an open end, said wave guide for surrounding the cylindrical volume of plasma;

means for generating a magnetic field in the plasma volume, said magnetic field establishing a cyclotron frequency $\Omega_i$ for ions in the plasma volume; and means for launching an electromagnetic wave through said open end and into said wave guide, said electromagnetic wave configured to create a circularly polarized electromagnetic wave in said wave guide of frequency ω, wherein $\Omega_i < \omega < c\epsilon/a$, with c being the speed of light and $\epsilon$ being the first null of $J_1'$ of said wave guide, said electromagnetic wave for imparting ponderomotive forces on plasma particles in the volume of plasma to prevent plasma particles from exiting the volume of plasma through said open end of said wave guide.

8. A device as recited in claim 7 wherein said circularly polarized electromagnetic wave in said wave guide is a $TE_{11}$ mode circularly polarized electromagnetic wave and wherein the E vector of said $TE_{11}$ mode circularly polarized electromagnetic wave rotates in a direction opposite to the direction of electron rotation in said plasma volume.

9. A device as recited in claim 7 wherein said cylindrical wave guide is centered about a longitudinal axis and said magnetic field is substantially uniform in said wave guide and is oriented along said longitudinal axis.

10. A device as recited in claim 9 wherein said electromagnetic wave is launched substantially in the direction of said magnetic field.

11. A device as recited in claim 7 wherein said electromagnetic wave is reflected from plasma particles in the volume of plasma creating reflected waves that exit said wave guide through said open end and wherein said device further comprises a resonance cavity positioned adjacent said open end of said wave guide to redirect reflected waves back through said open end and into said wave guide.

12. A device as recited in claim 11 wherein said resonance cavity comprises a resonance cavity wave guide of radius, 'b', wherein 'b'>'a', and a reflective endplate to allow said reflected waves to propagate through said resonance cavity wave guide and be reflected by said reflective endplate.

13. A device as recited in claim 11 wherein said resonance cavity comprises a resonance cavity wave guide of radius, 'b', wherein 'b'='a', and a reflective endplate, said resonance cavity wave guide being filled with a dielectric material to allow said reflected waves to propagate through said resonance cavity wave guide and be reflected by said reflective endplate.

14. A device as recited in claim 7 wherein said magnetic field establishes a cyclotron frequency $\Omega_e$ for electrons in the plasma volume and wherein said frequency ω, of said circularly polarized electromagnetic wave is less than said cyclotron frequency $\Omega_e$ for electrons in the plasma volume.

15. A plasma mass filter for separating low-mass particles from high-mass particles in a multi-species plasma, said plasma mass filter comprising:

a cylindrical wave guide of radius, 'a', formed with a first open end and a second open end, said wave guide surrounding a volume and being centered about a longitudinal axis;

means for generating a magnetic field in said volume, said magnetic field being aligned substantially parallel to said longitudinal axis, said magnetic field establishing a cyclotron frequency $\Omega_i$ for ions in the volume;

means for generating an electric field substantially perpendicular to said magnetic field to create crossed magnetic and electric fields in said volume, said electric field having a positive potential along said longitudinal axis and a substantially zero potential along said wave guide; means for introducing a material through said first open end and into said volume to establish a multi-species plasma in said volume for interaction with said crossed magnetic and electric fields for ejecting said high-mass particles into said wave guide and for confining said low-mass particles in said volume during transit through said wave guide and subsequent exit through said second open end to separate said low-mass particles from said high-mass particles; and means for launching an electromagnetic wave through said first open end of said wave guide and into said volume, said electromagnetic wave configured to create a circularly polarized electromagnetic wave in said volume of frequency ω, wherein $\Omega_i < \omega < c\ \epsilon/a$, with c being the speed of light and $\epsilon$ being the first null of $J_1'$ of said wave guide, said electromagnetic wave for imparting ponderomotive forces on plasma particles in said volume to prevent plasma particles from exiting said volume through said first open end of said wave guide.

16. A plasma mass filter as recited in claim 15 wherein said introduction means comprises a diffuse vapor source.

17. A plasma mass filter as recited in claim 15 wherein said circularly polarized electromagnetic wave in said volume is a $TE_{11}$ mode circularly polarized electromagnetic wave and wherein the E vector of said $TE_{11}$, mode circularly polarized electromagnetic wave rotates in a direction opposite to the direction of electron rotation in said volume.

18. A plasma mass filter as recited in claim 15 wherein said electromagnetic wave is launched substantially in the direction of said magnetic field.

19. A plasma mass filter as recited in claim 15 wherein said electromagnetic wave is reflected from plasma particles in said volume creating reflected waves that exit said wave guide through said first open end and wherein said device further comprises a resonance cavity positioned adjacent said first open end of said wave guide to redirect reflected waves back through said open end and into said wave guide.

20. A plasma mass filter as recited in claim 15 wherein said magnetic field establishes a cyclotron frequency $\Omega_e$ for electrons in said volume and wherein said frequency ω, of said circularly polarized electromagnetic wave is less than said cyclotron frequency $\Omega_e$ for electrons in said volume.

* * * * *

UNITED STATES PATENT AND TRADEMARK OFFICE

CERTIFICATE OF CORRECTION

PATENT NO. : 6,576,127 B1

DATED : June 10, 2003

INVENTOR(S) : Tihiro Ohkawa

It is certified that error appears in the above-identified patent and that said Letters Patent is hereby corrected as shown below:

<u>Title page, Item [54] and Column 1, line 1,</u>
After the word "FORCE" and before the word "PLUG" insert the word -- END --

<u>Column 3,</u>
Line 1, delete "(o" insert -- $\omega$ --
Line 6, delete "I=1" insert -- $\ell = 1$ --
Line 11, delete "$k^2=\omega^2(c^2=\lambda^{2}$" insert -- $k^2 = \omega^2 / c^2 - \lambda^2$ --
Line 13, delete "$\lambda=\in/a, \in$" insert -- $\lambda = \xi / a, \xi$ --
Line 26, delete "Ex+iEy" insert -- $E_x + i E_y$ --
Line 30, delete "$Bx+iB_y$" insert -- $B_x + iB_y$ --
Line 55, delete "$i[q^2n/ m]$" insert -- $i [ q^2 n / M ]$ --

<u>Column 4,</u>
Line 66, delete "$\omega<c\in/$" insert -- $\omega < c \xi /$ --
Line 67, delete "$\in$" insert -- $\xi$ --

<u>Column 6,</u>
Line 51, delete "$\omega<c\in/ a,$" insert -- $\omega < c \xi / a,$ --
Line 52, delete "$\in$" insert -- $\xi$ --

<u>Column 8,</u>
Line 15, delete "Mc" insert -- $M_c$ --

<u>Column 9,</u>
Line 29, delete "$c\in/a,$" insert -- $c \xi / a,$ --
Line 30, delete "$\in$" insert -- $\xi$ --

UNITED STATES PATENT AND TRADEMARK OFFICE

CERTIFICATE OF CORRECTION

PATENT NO. : 6,576,127 B1
DATED : June 10, 2003
INVENTOR(S) : Tihiro Ohkawa

It is certified that error appears in the above-identified patent and that said Letters Patent is hereby corrected as shown below:

Column 10,
Line 36, delete "$\in$/a," insert -- $\xi$ / a, --
Line 37, delete "$\in$" insert -- $\xi$ --

Signed and Sealed this

Twenty-third Day of September, 2003

JAMES E. ROGAN
*Director of the United States Patent and Trademark Office*